United States Patent
Go et al.

(10) Patent No.: US 11,846,424 B2
(45) Date of Patent: Dec. 19, 2023

(54) INJECTION NOZZLE, COMBUSTOR INCLUDING SAME NOZZLE, AND GAS TURBINE INCLUDING SAME COMBUSTOR

(71) Applicant: DOOSAN ENERBILITY CO., LTD, Changwon (KR)

(72) Inventors: Young Gun Go, Yongin (KR); Hyun Soo An, Yongin (KR)

(73) Assignee: DOOSAN ENERBILITY CO., LTD., Changwon (KR)

(*) Notice: Subject to any disclaimer, the term of this patent is extended or adjusted under 35 U.S.C. 154(b) by 0 days.

(21) Appl. No.: 17/561,964

(22) Filed: Dec. 26, 2021

(65) Prior Publication Data
US 2022/0243918 A1 Aug. 4, 2022

(30) Foreign Application Priority Data
Feb. 3, 2021 (KR) .................. 10-2021-0015389

(51) Int. Cl.
F23R 3/28 (2006.01)
(52) U.S. Cl.
CPC .................... F23R 3/286 (2013.01)
(58) Field of Classification Search
CPC ............. F23R 3/286; F23R 3/34–36; F23R 2900/00012; F23R 3/02; F23R 3/04; F23D 14/62; F23D 14/64; F23D 14/70; F23D 14/82; F23D 2209/10
See application file for complete search history.

(56) References Cited

U.S. PATENT DOCUMENTS

| 8,438,851 | B1* | 5/2013 | Uhm | F23R 3/286 60/737 |
| 2010/0101229 | A1* | 4/2010 | York | F23R 3/283 60/737 |
| 2011/0197587 | A1* | 8/2011 | Zuo | F23D 14/02 239/398 |
| 2013/0025284 | A1* | 1/2013 | Wu | F23R 3/34 60/737 |
| 2017/0268780 | A1* | 9/2017 | Purcell | F23R 3/286 |
| 2017/0284677 | A1* | 10/2017 | Horikawa | F23R 3/10 |
| 2017/0321609 | A1* | 11/2017 | Ogata | F23R 3/36 |
| 2019/0107284 | A1* | 4/2019 | Seo | F23R 3/286 |
| 2021/0325046 | A1* | 10/2021 | Lin | F23R 3/16 |

FOREIGN PATENT DOCUMENTS

JP 2014105886 A * 6/2014
KR 10-2019-0040666 A 4/2019

* cited by examiner

*Primary Examiner* — Katheryn A Malatek
*Assistant Examiner* — Jingchen Liu
(74) *Attorney, Agent, or Firm* — Harvest IP Law, LLP (57) ABSTRACT

An injection nozzle installed in a combustor of a gas turbine to inject fuel and compressed air to a combustion chamber is provided. The injection nozzle includes an inlet portion into which fuel and compressed air are introduced, an outlet portion installed downstream of the inlet portion in a flow direction of fluid and configured to discharge the fuel and compressed air to the combustion chamber, and an intermediate portion obliquely installed between the inlet portion and the outlet portion and connected to each of the inlet portion and outlet portion.

12 Claims, 6 Drawing Sheets

INJECTION NOZZLE, COMBUSTOR INCLUDING SAME NOZZLE, AND GAS TURBINE INCLUDING SAME COMBUSTOR

CROSS REFERENCE TO RELATED APPLICATION

This application claims priority to Korean Patent Application No. 10-2021-0015389, filed on Feb. 3, 2021, the disclosure of which is incorporated herein by this in its entirety.

BACKGROUND

1. Field

Apparatuses and methods consistent with exemplary embodiments relate to an injection nozzle, a combustor, and a gas turbine equipped with the same, and more particularly, to an injection nozzle provided in a combustor of a gas turbine to inject fuel and compressed air into a combustion chamber of the combustor.

2. Description of the Related Art

A turbo machine refers to a device that generates a driving force used to generate electric power with fluid (e.g., gas) passing through the turbo machine. Therefore, a turbo machine and a generator are usually used together. The turbo machine may include gas turbines, steam turbines, wind power turbines, and the like. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator to rotate the turbine blades.

The combustor of the gas turbine includes a nozzle casing, a liner installed downstream of the nozzle casing and having a combustion chamber in which the fuel-air mixture is combusted, and a transition piece installed downstream of the liner to supply combustion gas to the turbine section, and an injection nozzle which is installed inside the nozzle casing and discharges the fuel-air mixture to the combustion chamber.

The combustor section of a related art gas turbine is equipped with a plurality of straight tube-type injection nozzles and has a problem in that the flame generated in the combustion chamber or the radiant heat radiating from an inner wall of the combustion chamber is not blocked and is transmitted to a portion of the injection nozzle in which fuel and compressed air are mixed. For this reason, the related art gas turbine undergoes self-ignition in which the fuel-air mixture is spontaneously ignited by the radiant heat transferred to the injection nozzle or the flash-back phenomenon in which the flame generated in the combustion chamber flows backward instead of proceeding to the turbine section.

SUMMARY

Aspects of one or more exemplary embodiments provide an injection nozzle capable of preventing flame or radiant heat generated by combustion of a mixture of fuel and compressed air from being transferred to an inner area in which the fuel and compressed air are mixed, a combustor including the injection nozzle, and a gas turbine including the combustor.

Additional aspects will be set forth in part in the description which follows and, in part, will become apparent from the description, or may be learned by practice of the exemplary embodiments.

According to an aspect of an exemplary embodiment, there is provided an injection nozzle including: an inlet portion into which the fuel and the compressed air are introduced; an outlet portion disposed downstream of the inlet portion in a flow direction of fluid and configured to discharge the fuel and compressed air to the combustion chamber; and an intermediate portion obliquely installed between the inlet portion and the outlet portion and connected to each of the inlet portion and the outlet portion.

According to an aspect of another exemplary embodiment, there is provided a combustor including: a nozzle casing configured to receive compressed air from a compressor and to receive fuel from an outside; a liner disposed downstream of the nozzle casing in a flow direction of fluid and defining a combustion chamber in which a mixture of the fuel and the compressed air is combusted; a transition piece disposed downstream of the liner and configured to supply combustion gas generated in the combustion chamber to a turbine; and an injection nozzle disposed in the nozzle casing to inject the fuel and the compressed air into the combustion chamber. The injection nozzle includes: an inlet portion into which the fuel and the compressed air are introduced; an outlet portion disposed downstream of the inlet portion in the flow direction of fluid and configured to discharge the fuel and compressed air to the combustion chamber; and an intermediate portion obliquely installed between the inlet portion and the outlet portion and connected to each of the inlet portion and the outlet portion.

According to an aspect of another exemplary embodiment, there is provided a gas turbine including: a compressor configured to take in air and to compress the air; a combustor configured to mix fuel with compressed air supplied from the compressor and combust the fuel-air mixture to produce combustion gas; and a turbine rotated by the combustion gas produced by the combustor to generate electric power. The combustor includes: a nozzle casing; a liner disposed downstream of the nozzle casing in a flow direction of fluid and defining a combustion chamber in which the fuel-air mixture is combusted; a transition piece disposed downstream of the liner and configured to supply the combustion gas to the turbine; and an injection nozzle disposed in the nozzle casing to inject the fuel and the compressed air into the combustion chamber. The injection nozzle includes: an inlet portion into which the fuel and the compressed air are introduced; an outlet portion disposed downstream of the inlet portion in the flow direction of fluid and configured to discharge the fuel and compressed air to the combustion chamber; and an intermediate portion obliquely installed between the inlet portion and the outlet portion and connected to each of the inlet portion and the outlet portion.

The intermediate portion may be formed such that an inner width thereof increases toward a downstream side.

When one of directions perpendicular to the flow direction of the fluid flowing through the outlet portion is a first direction and a direction opposite to the first direction is a second direction, and when directions perpendicular to the flow direction of the fluid in the outlet portion and perpendicular to the first and second directions are third and fourth directions, respectively, the intermediate portion is formed such that an inner width in the first and second directions increases toward the downstream side and an inner width in the third and fourth directions is constant or decreases toward the downstream side.

Among walls defining an inner space of the intermediate portion, when one of the walls is a first intermediate wall and one wall opposite to the first intermediate wall is a second intermediate wall, and among walls defining an inner space of the outlet portion, when a wall connected to the first intermediate wall is a first outlet wall and a wall connected to the second intermediate wall is a second outlet wall, an angle between a first extension line extending from the first outlet wall and the first intermediate is greater than an angle between a second extension line extending from the second outlet wall and the second intermediate wall.

When one of directions perpendicular to the flow direction of the fluid flowing through the outlet portion is a first direction and a direction opposite to the first direction is a second direction, the intermediate portion is inclined from the outlet portion toward the second direction, and the first intermediate wall and the second intermediate wall may be a first direction side wall and a second direction side wall of the intermediate portion, respectively.

Each of the inlet portion, the outlet portion, and the intermediate portion may have a prismatic shape.

The injection nozzle may further include: an auxiliary supply unit installed in the inlet portion to supply the introduced air to the intermediate portion; and a sealing unit installed in the intermediate portion and connected to the auxiliary supply unit to seal the auxiliary supply unit at a downstream side.

The sealing unit may extend downstream along an inner surface of the intermediate portion.

Among walls defining an inner space of the intermediate portion, when one of the walls is a first intermediate wall and one wall opposite to the first intermediate wall is a second intermediate wall, and when one of directions perpendicular to the flow direction of the fluid flowing through the outlet portion is a first direction and a direction opposite to the first direction is a second direction, and when directions perpendicular to the flow direction of the fluid in the outlet portion and perpendicular to the first and second directions are third and fourth directions, respectively, the intermediate portion is inclined from the outlet portion toward the second direction, the first intermediate wall and the second intermediate wall may be a first direction side wall and a second direction side wall of the intermediate, respectively, a width between the sealing unit and the first intermediate wall in the first and second directions increases toward the downstream side, and a width in the third and fourth directions is constant or decreases toward the downstream side, and a width between the sealing unit and the second intermediate wall in the first and second directions increases toward the downstream side, and a width in the third and fourth directions is constant or decreases toward the downstream side.

Among walls defining an inner space of the intermediate portion, when one of the walls is a first intermediate wall and one wall opposite to the first intermediate wall is a second intermediate wall, and among walls defining an inner space of the outlet portion, when a wall connected to the first intermediate wall is a first outlet wall and a wall connected to the second intermediate wall is a second outlet wall, and when one of directions perpendicular to the flow direction of the fluid flowing through the outlet portion is a first direction and a direction opposite to the first direction is a second direction, the intermediate portion is inclined from the outlet portion toward the second direction, the first intermediate wall and the second intermediate wall may be a first direction side wall and a second direction side wall of the intermediate, respectively, an angle between a first extension line extending from the first outlet wall and the first intermediate wall is greater than an angle between the first outlet wall and a third extension line extending from a first sealing wall of the sealing unit which faces the first intermediate wall, and an angle between the second outlet wall and the second intermediate wall is greater than an angle between a second extension line extending from the second outlet wall and a second sealing wall of the sealing unit which faces the second intermediate wall.

When one of directions perpendicular to the flow direction of the fluid flowing through the outlet portion is a first direction and a direction opposite to the first direction is a second direction, the intermediate portion is inclined from the outlet portion toward the second direction, and the auxiliary supply unit may include a plurality of auxiliary supply units arranged at intervals in the first and second directions, and the sealing unit may include a plurality of sealing units arranged at intervals in the first and second directions.

The injection nozzle, the combustor including the same nozzle, and the gas turbine including the same combustor according to one or more exemplary embodiments are formed such that the intermediate portion provided between the inlet portion and the outlet portion is obliquely installed with respect to each of the inlet portion and the outlet portion. Therefore, the flame or radiant heat generated in the combustion chamber and introduced into the injection nozzle through the outlet portion of the injection nozzle can be reflected to the combustion chamber from the intermediate portion without reaching the inlet portion in which fuel and compressed air are mixed, thereby preventing autoignition or flash-back that has occurred in combustors.

In addition, according to one or more exemplary embodiments, by providing an auxiliary supply unit and a sealing unit inside the inlet portion and the intermediate portion, respectively, it is possible to adjust the flow rate of a mixture of fuel and compressed air injected from the injection nozzle to the combustion chamber.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

Terms used herein are used to merely describe specific embodiments and are not intended to limit the scope of the disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

For clear illustration, components that are irrelevant to the description are omitted, and like reference numerals refer to like components throughout the specification. In certain embodiments, a detailed description of known functions and configurations that may obscure the gist of the present disclosure will be omitted. For the same reason, some of the elements in the drawings are exaggerated, omitted, or schematically illustrated.

Hereinafter, an injection nozzle, a combustor, and a gas turbine including the combustor according to an exemplary embodiment will be described with reference to the accompanying drawings.

Figure 1:
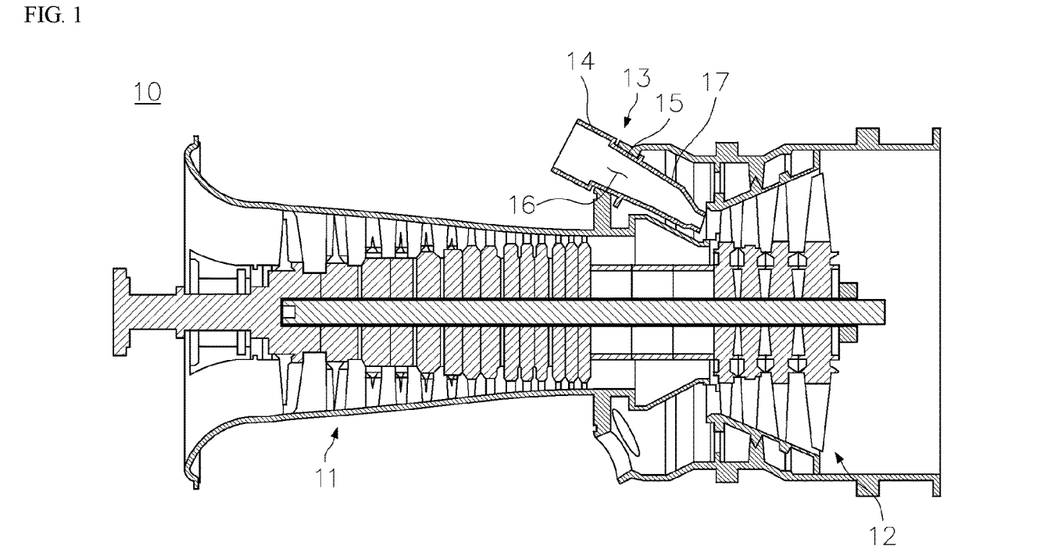
FIG. 1 is a cross-sectional view of a gas turbine according to an exemplary embodiment.

FIG. 1 is a cross-sectional view of a gas turbine according to an exemplary embodiment. Referring to FIG. 1, a gas turbine 10 includes a compressor 11, a combustor 13, and a turbine 12. In a flow direction of gas (for example, compressed air or combustion gas), the compressor 11 is disposed on an upstream side of the gas turbine 10 and the turbine 12 is disposed on a downstream side of the gas turbine 10. The combustor 13 is disposed between the compressor 11 and the turbine 12.

The compressor 11 includes compressor vanes and compressor rotors in a compressor casing. The turbine 12 includes turbine vanes and turbine rotors in a turbine casing. The compressor vanes and the compressor rotors are arranged in multiple stages along the flow direction of compressed air, and the turbine vanes and the turbine rotors are also arranged in multiple stages along the flow direction of combustion gas. The compressor 11 has an internal space of which a volume decreases from a front stage to a rear stage so that the introduced air can be compressed while passing through the inside of the compressor 11, whereas the turbine 12 has an internal space of which a volume increases from a front stage to a rear stage so that the combustion gas supplied from the combustor 13 can expand while passing through the inside of the turbine 12.

In addition, a torque tube serving as a torque transmission member is disposed between the last-stage compressor rotor of the compressor 11 and the first-stage turbine rotor of the turbine 12 to transfer the torque generated by the turbine 12 to the compressor 11. Although, the torque tube may include a plurality of torque tube disks arranged in three stages as illustrated in FIG. 1, this is only an example, and the torque tube may include torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction of the compressor. That is, the compressor disks are arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer surface of each of the compressor disks along a circumferential direction of the compressor disk. For each compressor stage, the plurality of compressor vanes coupled to an inner surface of the compressor casing in the circumferential direction are alternately arranged with the plurality of compressor blades. While the compressor disks rotate along with a rotation of the tie rod, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be collectively defined as a compressor stator to be distinguished from the compressor rotor.

The tie rod is installed to extend through the centers of the plurality of compressor disks and the plurality of turbine disks such that one end of the tie rod is fastened to the compressor disk located on the foremost end side of the compressor, and the other end thereof is fastened by a fixing nut.

Because the tie rod may be formed in various structures according to a type of a gas turbine, a shape of the tie rod is not limited to the example illustrated in FIG. 1. There are three types of tie rod including: a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases a pressure of fluid flowing into the combustor and adjusts the flow angle of the fluid to be substantially equal to the designed flow angle.

The combustor 13 mixes the introduced compressed air with fuel and burns the fuel-air mixture to produce high-temperature and high-pressure combustion gas with high energy, thereby raising the temperature of the combustion gas to a heat-resistant temperature at which components of the combustor and components of turbine can endure through an isothermal combustion process.

Figure 2:
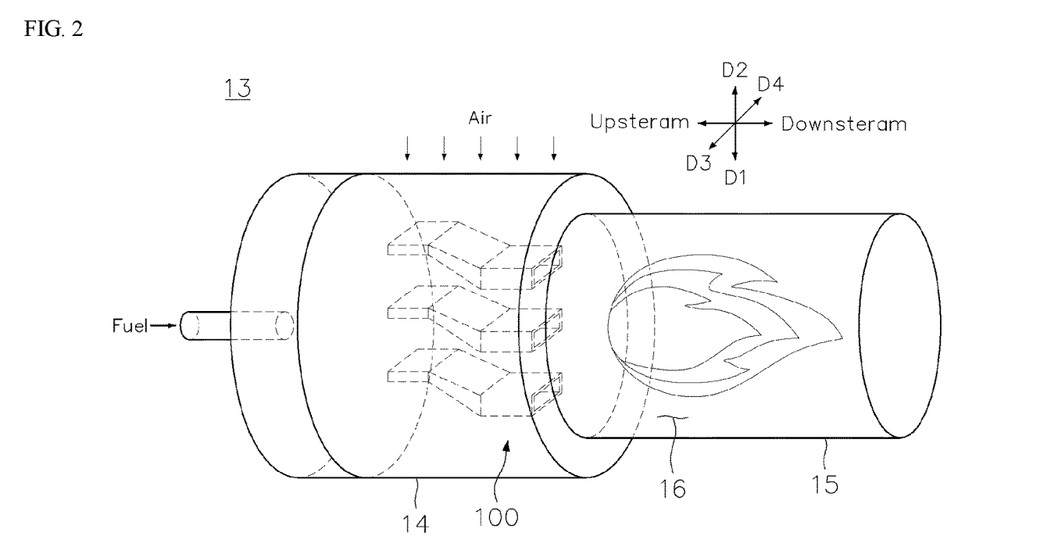
FIG. 2 is a perspective view of a combustor included in the gas turbine of FIG. 1.

FIG. 2 is a perspective view of a combustor included in the gas turbine of FIG. 1. Referring to FIG. 2, a plurality of combustors constituting the combustor 13 may be arranged in a form of a cell in a combustor casing. Each combustor 13 includes a nozzle casing 14, a plurality of injection nozzles 100 accommodated in the nozzle casing 14 to inject fuel, a liner 15 defining a combustion chamber 16, and a transition piece 17 connecting the combustor 16 chamber to the turbine 12.

The liner 15 provides a combustion space in which the fuel and compressed air injected from the injection nozzles 100 are mixed and burned. That is, the liner 15 includes the combustion chamber 16 having a combustion space in which the fuel-air mixture is combusted and an annular liner flow passage that surrounds the combustion chamber 16 to provide an annular space. he plurality of injection nozzles disposed inside the nozzle casing 14 mix the fuel supplied from the outside with the compressed air supplied from the compressor 11 and inject the fuel-air mixture into the combustion chamber 16. The injection nozzle 100 for injecting fuel is installed in front end of the liner 15, and an igniter is installed in the side wall of the liner 15. In addition, a nozzle plate may be installed between the nozzle casing 14 and the liner 15. The nozzle plate separates the combustion chamber 16 from the inner space of the nozzle casing 14 and is installed at the downstream end of the injection nozzle 100 in the flow direction of the fluid.

In the annular liner flow passage, compressed air introduced through a plurality of holes formed in an outer wall of the liner 15 flows, and the introduced compressed air cools the liner 15 while flowing toward the transition piece 17. Because the compressed air flows along the outer wall of the liner 15, it is possible to prevent the liner 15 from being thermally damaged by high temperature combustion gas.

The transition piece 17 is connected to the rear end (i.e., downstream end) of the liner 15 to deliver the combustion gas to the turbine. The transition piece 17 has an annular flow passage surrounding an inner space of the transition piece 17. Compressed air flows through the annular flow passage along the outer wall of the transition piece 17 to cool the outer wall of the transition piece 17, thereby preventing the transition piece 17 from being thermally damaged by high temperature combustion gas.

The high-temperature and high-pressure combustion gas supplied to the turbine 12 expands while passing through the inside of the turbine 12. The expansion of the combustion gas causes impulse and reaction forces with respect to the turbine blades, thereby generating torque. The torque is transferred to the compressor through the torque tube, and an excessive portion of the torque exceeding the driving force required to drive the compressor is used to drive a generator or the like.

The turbine 12 is similar in structure to the compressor 11. That is, the turbine 12 includes a plurality of turbine rotors similar to the compressor rotors of the compressor 11. Each turbine rotor includes a turbine rotor disk and a plurality of turbine blades radially coupled to an outer surface of the turbine rotor disk. The turbine disk and the plurality of turbine blades are designed in a structure in which they are arranged in a multi-stage to be spaced apart from each other along a flow direction of the combustion gas. A plurality of turbine vanes are radially coupled to the inner surface of the turbine casing along the circumferential direction such that each stage of turbine vanes is disposed between adjacent stages of turbine blades to guide a flow direction of the combustion gas passing through the turbine blades. Here, the turbine casing and the turbine vanes may be collectively defined as a turbine stator to distinguish them from the turbine rotor.

Figure 3:
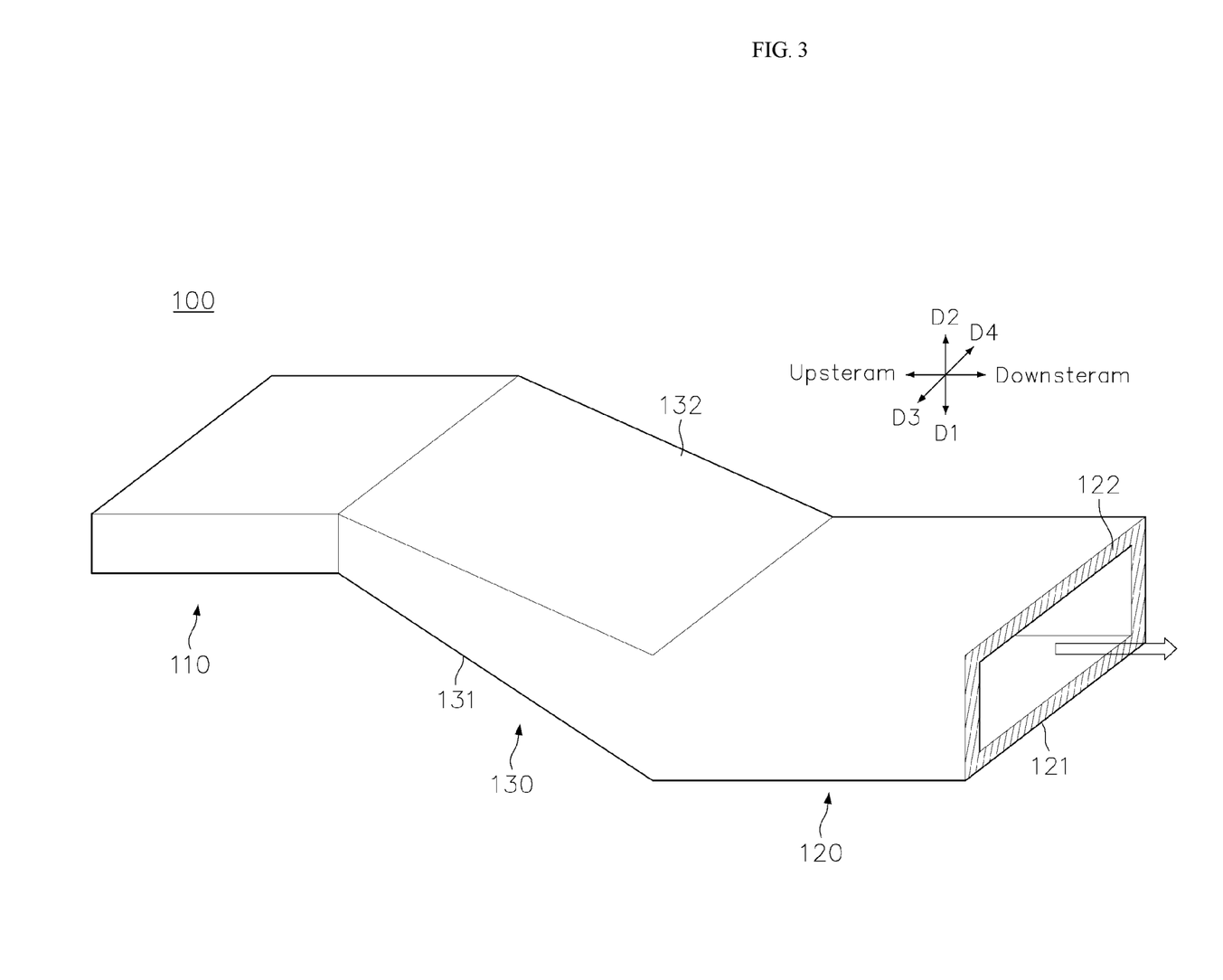
FIG. 3 is a perspective view illustrating an injection nozzle included in the combustor of FIG. 2.
Figure 4:
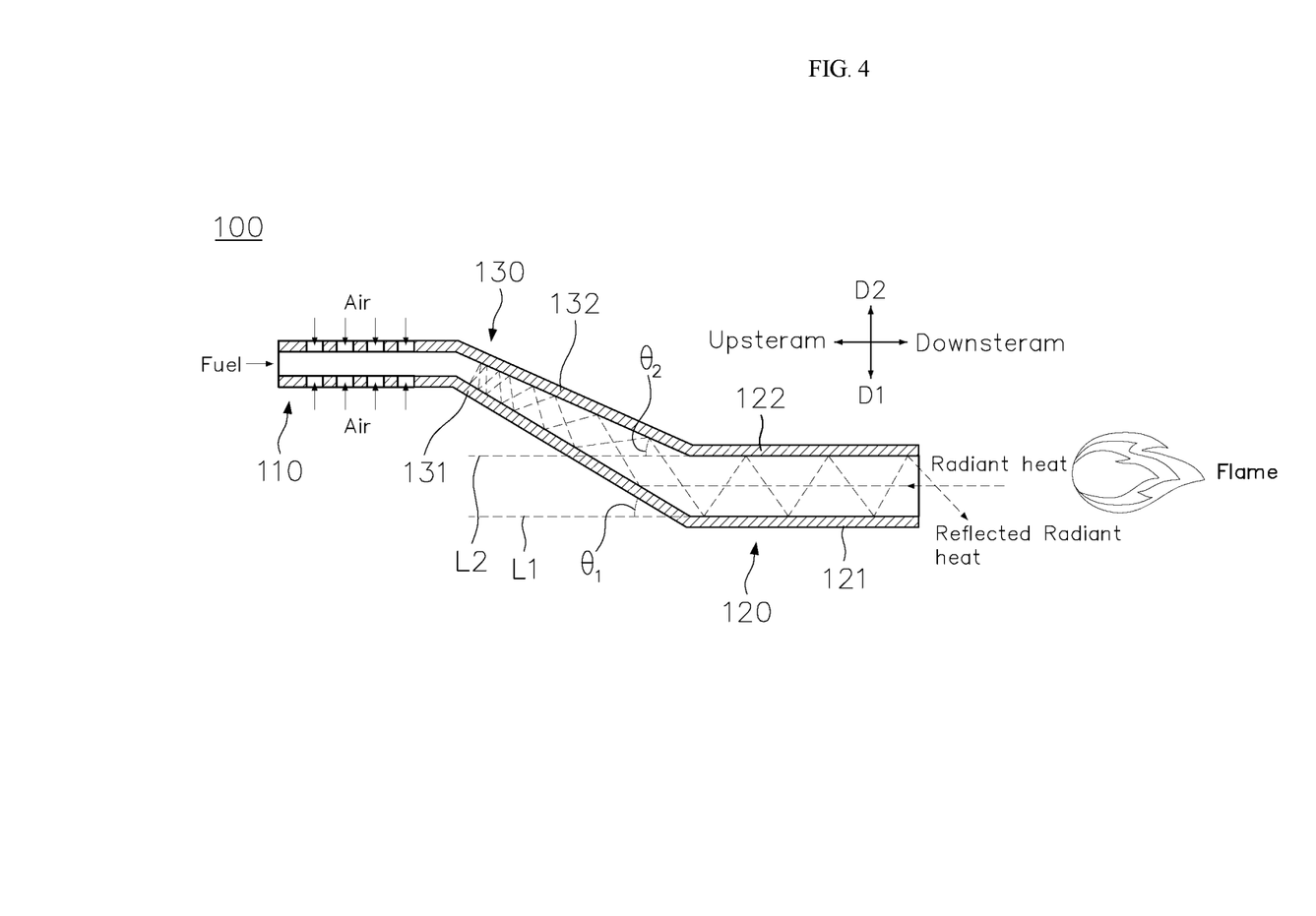
FIG. 4 is a cross-sectional view illustrating an injection nozzle included in the combustor of FIG. 3 according to a first exemplary embodiment.

FIG. 3 is a perspective view illustrating an injection nozzle included in the combustor of FIG. 2. FIG. 4 is a cross-sectional view illustrating an injection nozzle included in the combustor of FIG. 3 according to a first exemplary embodiment.

Referring to FIGS. 3 and 4, each of the injection nozzles 100 includes an inlet portion 110, an outlet portion 120, and an intermediate portion 130. Although each of the inlet portion 110, the outlet portion 120, and the intermediate portion 130 is formed in a shape of a square column in FIG. 3, this is only an example, and the inlet portion 110, the outlet portion, and the intermediate portion 130 may be formed in a different shape, e.g., prismatic shapes.

Fuel and compressed air are introduced into and mixed in the inlet portion 110. Fuel may be introduced through a main opening of the inlet portion 110, and compressed air may be introduced through a hole formed in a wall of the inlet portion 110. The output portion 120 is installed on a downstream side in the flow direction of the mixture of fuel and compressed air flowing through the inlet portion 110 to inject the fuel-air mixture into the combustion chamber 16. The intermediate portion 130 is disposed between the inlet portion 110 and the outlet portion 120 and is connected to the inlet portion 110 and the outlet portion 120. The intermediate portion 130 is installed obliquely with respect to each of the inlet portion 110 and the outlet portion 120.

Here, one of directions perpendicular to the flow direction of the fluid flowing through the outlet portion 120 is referred to as a first direction D1, and a direction opposite to the first direction D1 is referred to as a second direction D2. Among directions defining an inner width of the intermediate portion 130, directions perpendicular to the first and second directions D1 and D2 are referred to as a third direction D3 and a fourth direction D4. That is, the third and fourth directions D3 and D4 are perpendicular to the flow direction of the fluid flowing through the outlet portion 120 and are perpendicular to the first and second directions D1 and D2. The third direction D3 and the fourth direction D4 are opposite to each other.

The intermediate portion 130 is formed in a shape in which an inner width increases toward the downstream side. For example, in the intermediate portion 130, the inner width of the intermediate portion 130 in the first and second directions D1 and D2 increases toward the downstream side but the inner width of the intermediate portion 130 in the third and fourth directions D3 and D4 is constant or decreases toward the downstream side.

The intermediate portion 130 is inclined toward the second direction D2 from the outlet portion 120. For example, among walls defining the inner space of the intermediate portion 130, one wall is referred to as a first intermediate wall 131 and a wall opposite to the first intermediate wall 131 is referred to as a second intermediate wall 132. In addition, among walls defining the inner space of the outlet portion 120, a wall connected to the first intermediate wall 131 is referred to as a first outlet wall 121 and a wall connected to the second intermediate wall 132 is referred to as a second outlet wall 122. In this case, the first intermediate wall 131 is disposed in the first direction D1, and the second intermediate wall 132 is disposed in the second direction D2.

Referring to FIG. 4, an angle $\theta_1$ between a first extension line L1 extending from the first outlet wall 121 and the first intermediate wall 131 is greater than an angle $\theta_2$ between a second extension line L2 extending from the second outlet wall 121 and the second intermediate wall 132.

If the intermediate portion 130 is designed to have the shape described above, radiant heat generated in the combustion chamber 16 and propagated toward the injection nozzle 100 returns to the combustion chamber 16 by continuously reflecting from the first intermediate wall 131 when reaching the intermediate portion 130. Therefore, according to the exemplary embodiment, it is possible to prevent the transfer of the radiant heat to the inlet portions 110 in which fuel and compressed air are mixed, thereby preventing an autoignition or flash-back phenomenon in the combustor 13.

Figure 5:
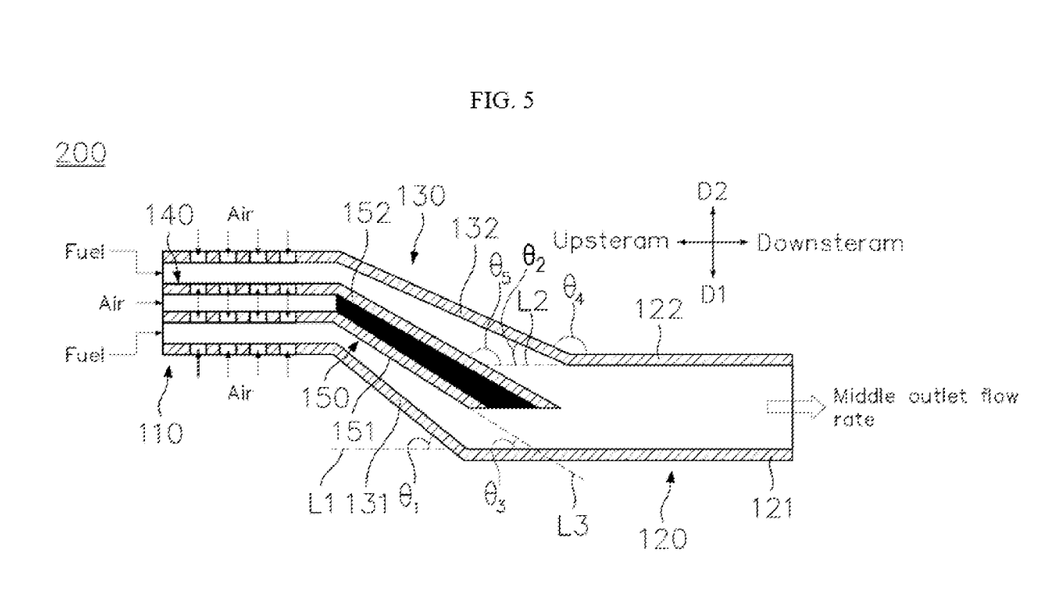
FIG. 5 is a view illustrating an injection nozzle according to a second exemplary embodiment.
Figure 6:
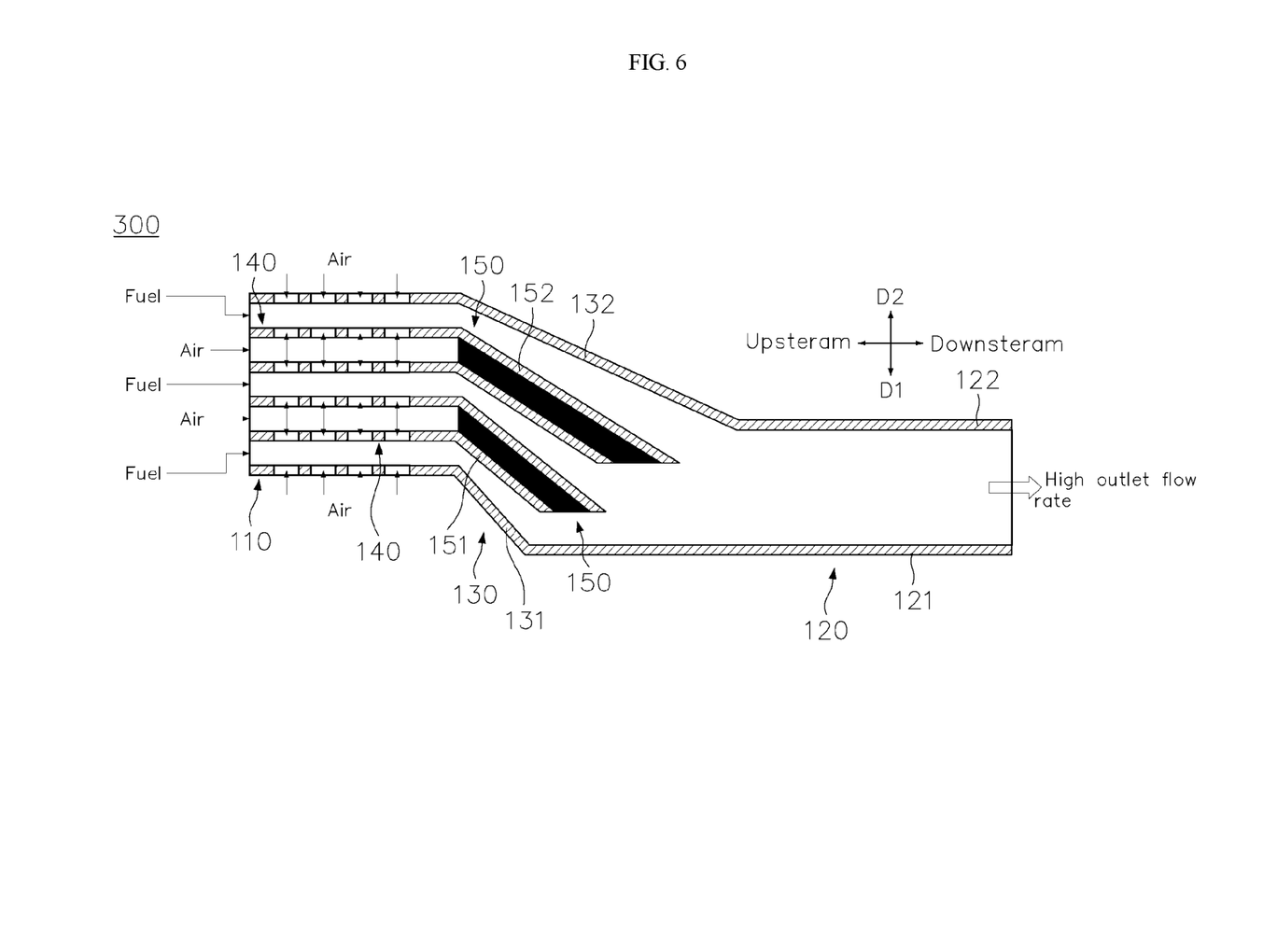
FIG. 6 is a view illustrating an injection nozzle according to a third exemplary embodiment.

FIG. 5 is a view illustrating an injection nozzle according to a second exemplary embodiment. FIG. 6 is a view illustrating an injection nozzle according to a third exemplary embodiment.

Referring to FIG. 5, an injection nozzle 200 according to the second exemplary embodiment may further include an auxiliary supply unit 140 and a sealing unit 150. The auxiliary supply unit 140 is installed inside the inlet portion 110 to transfer the introduced compressed air to the intermediate portion 130. The sealing unit 150 is installed in the intermediate portion 130 and is connected to the auxiliary supply unit 140 to seal the auxiliary supply unit 140 at a downstream side.

The sealing unit 150 is formed in a shape extending downstream along an inner surface of the intermediate portion 130. A width between the sealing unit 150 and the first intermediate wall 131 in the first and second directions D1 and D2 increases toward the downstream side, but a width in the third and fourth directions D3 and D4 does not change or decreases toward the downstream side. Also, a width between the sealing unit 150 and the second intermediate wall 132 in the first and second directions D1 and D2 increases toward the downstream side, but a width in the third and fourth directions D3 and D4 does not change or decreases toward the downstream side.

In addition, an angle $\theta_1$ between an extension line L1 extending from the first outlet wall 121 and the first intermediate wall 131 is greater than an angle $\theta_3$ between the first outlet wall 122 and an extension line L3 extending from a first sealing wall 151 of the sealing unit 150 which faces the first intermediate wall 131. In addition, an angle $\theta_4$ between the second outlet wall 122 and the second intermediate wall 131 is greater than an angle $\theta_5$ between the second extension line L2 extending from the second outlet wall 122 and a second sealing wall 152 of the sealing unit 150 which faces the second intermediate wall 132.

If the injection nozzle 200 is designed to have the structure described above, radiant heat generated in the combustion chamber 16 and introduced into a space between the sealing unit 150 and the intermediate portion 130 returns to the combustion chamber 16 due to continuous reflection.

Referring to FIG. 6, in an injection nozzle 300 according to the third exemplary embodiment, the auxiliary supply unit 140 may include a plurality of auxiliary supply units 140 arranged at intervals in the first and second directions D1 and D2 and the sealing unit 150 may include a plurality of sealing units 150 arranged at intervals in the first and second directions D1 and D2. As the number of auxiliary supply units 140 and the number of sealing units 150 increase, the fluid flow area inside the injection nozzle 300 decreases, and thus the outlet flow velocity of the injection nozzle 300 increases. Therefore, the auxiliary supply units 140 and the sealing units 150 may vary depending on the design purpose. For example, to set the outlet flow velocity rate of the injection nozzle 200 to an intermediate level, one auxiliary supply unit 140 and one sealing unit 150 may be installed as shown in FIG. 5. In order to increase the outlet flow velocity from the injection nozzle 300, two or more auxiliary supply units 140 and two or more sealing units 150 may be installed as shown in FIG. 6. That is, according to the second and third exemplary embodiments, the auxiliary supply unit 140 and the sealing unit 150 may be provided to adjust the outlet flow velocity of the injection nozzle 200 or 300 according to the design purpose.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An injection nozzle for injecting fuel and compressed air into a combustion chamber of a combustor of a gas turbine, the injection nozzle comprising:
    an inlet portion receiving the fuel and a first portion of the compressed air;
    an outlet portion located downstream of the inlet portion in a flow direction of a mixture of the fuel and compressed air, and configured to discharge the mixture of the fuel and the compressed air to the combustion chamber; and
    an intermediate portion obliquely installed between the inlet portion and the outlet portion and connected to each of the inlet portion at an upstream end of the intermediate portion relative to the flow direction and the outlet portion at a downstream end of the intermediate portion relative to the flow direction, wherein a centerline of the intermediate portion extends from the upstream end of the intermediate portion to the downstream end of the intermediate portion,
    an auxiliary supply unit installed in the inlet portion to supply an auxiliary air to the intermediate portion, the auxiliary air being a second portion of the compressed air; and
    a sealing unit obliquely installed in the intermediate portion and connected to the auxiliary supply unit to seal the auxiliary supply unit at a downstream end of the auxiliary supply unit relative to the flow direction,
    wherein a plurality of intermediate walls form the intermediate portion and the plurality of intermediate walls comprise a first intermediate wall located at a first side of the centerline of the intermediate portion and a second intermediate wall located at a second side of the centerline of the intermediate portion opposite to the first intermediate wall, and
    a plurality of outlet walls form the outlet portion and the plurality of outlet walls comprise a first outlet wall extending from the first intermediate wall and a second outlet wall extending from the second intermediate wall, and
    a plurality of sealing walls form the sealing unity and the plurality of sealing walls comprise a first sealing wall facing to the first intermediate wall and a second sealing wall facing to the second intermediate wall, and an angle A is defined as an angle between a first extension line extending from the first outlet wall and the first intermediate wall, an angle B is defined as an angle between the second outlet wall and the second intermediate wall, an angle C is defined as an angle between a second extension line extending from the second outlet wall and the second sealing wall, an angle D is defined as an angle between the first outlet wall and a third extension line extending from the first sealing wall, an angle A is larger than the angle D and the angle B is larger than the angle C.

2. The injection nozzle according to claim 1, wherein an inner width of the intermediate portion increases toward the downstream end of the intermediate portion relative to the flow direction.

3. The injection nozzle according to claim 1, wherein
a third intermediate wall of the plurality of intermediate walls is located at a third side of the centerline of the intermediate portion and connected to each of the first intermediate wall and the second intermediate wall;
a fourth intermediate wall of the plurality of intermediate walls is located at a fourth side of the centerline of the intermediate portion opposite to the third intermediate wall and connected to each of the first intermediate wall and the second intermediate wall;
the intermediate portion is formed such that a first inner width between the first intermediate wall and the second intermediate wall increases towards the downstream end of the intermediate portion relative to the flow direction and a second inner width between the third intermediate wall and the fourth intermediate wall is constant or decreases toward the downstream end of the intermediate portion relative to the flow direction.

4. The injection nozzle according to claim 1, wherein an angle E is defined as an angle between the second extension line extending from the second outlet wall and the second intermediate wall, and the angle A is larger than the angle E.

5. The injection nozzle according to claim 1, wherein
a third intermediate wall of the plurality of intermediate walls is located at a third side of the centerline of the intermediate portion and connected to each of the first intermediate wall and the second intermediate wall;
a fourth intermediate wall of the plurality of intermediate walls is located at a fourth side of the centerline of the intermediate portion opposite to the third intermediate wall and connected to each of the first intermediate wall and the second intermediate wall;
a first width between the first sealing wall and the first intermediate wall increases toward the downstream end of the intermediate portion relative to the flow direction, and a second width between the third intermediate wall and the fourth intermediate wall is constant or decreases toward the downstream end of the intermediate portion relative to the flow direction, and
a third width between the second sealing wall and the second intermediate wall increases toward the downstream end of the intermediate portion relative to the flow direction.

6. The injection nozzle according to claim 1, wherein
the auxiliary supply unit includes a plurality of auxiliary supply units arranged spaced apart from each other, and the sealing unit includes a plurality of sealing units arranged spaced apart from each other.

7. The injection nozzle according to claim 1, wherein both of the intermediate portion and the sealing unit are inclined from the inlet portion toward a same direction relative to the flow direction.

8. A combustor comprising:
a nozzle casing configured to receive compressed air from a compressor and to receive fuel from an outside;
a liner located downstream of the nozzle casing in a flow direction of a mixture of the fuel and the compressed air, and defining a combustion chamber in which the mixture of the fuel and the compressed air is combusted;
a transition piece located downstream of the liner relative to the flow direction and configured to supply combustion gas generated in the combustion chamber to a turbine; and
an injection nozzle located in the nozzle casing to inject the mixture of the fuel and the compressed air into the combustion chamber,
wherein the injection nozzle comprises:
an inlet portion receiving the fuel and a portion of the compressed air;
an outlet portion located downstream of the inlet portion in the flow direction and configured to discharge the mixture of the fuel and the compressed air to the combustion chamber; and
an intermediate portion obliquely installed between the inlet portion and the outlet portion and connected to each of the inlet portion at an upstream end of the intermediate portion relative to the flow direction and the outlet portion at a downstream end of the intermediate portion relative to the flow direction, wherein a centerline of the intermediate portion extends from the upstream end of the intermediate portion to the downstream end of the intermediate portion,
an auxiliary supply unit installed in the inlet portion to supply an auxiliary air to the intermediate portion, the auxiliary air being a second portion of the compressed air; and
a sealing unit obliquely installed in the intermediate portion and connected to the auxiliary supply unit to seal the auxiliary supply unit at a downstream end of the auxiliary supply unit relative to the flow direction,
wherein a plurality of intermediate walls form the intermediate portion and the plurality of intermediate walls comprise a first intermediate wall and a second intermediate wall located opposite to the first intermediate wall, and
a plurality of outlet walls form the outlet portion and the plurality of outlet walls comprise a first outlet wall extending from the first intermediate wall and the second outlet wall extending from the second intermediate wall,
an angle X is defined as an angle between a first extension line extending from the first outlet wall and the first intermediate wall and an angle Y is defined as an angle between a second extension line extending from the second outlet wall and the second intermediate wall, and the angle X is larger than the angle Y.

9. The combustor according to claim 8, wherein an inner width of the intermediate portion increases toward a downstream end of the intermediate portion relative to the flow direction.

10. The combustor according to claim 8, wherein
the first intermediate wall is located at a first side of the centerline of the intermediate portion and the second intermediate wall is located at a second side of the centerline of the intermediate portion opposite to the first intermediate wall,
a third intermediate wall of the plurality of intermediate walls is located at a third side of the centerline of the intermediate portion and connected to each of the first intermediate wall and the second intermediate wall,
a fourth intermediate wall of the plurality of intermediate walls is located at a fourth side of the centerline of the intermediate portion opposite to the third intermediate wall and connected to each of the first intermediate wall and the second intermediate wall,
the intermediate portion is formed such that a first inner width between the first intermediate wall and the second intermediate wall increases toward the downstream end of the intermediate portion relative to the flow direction and a second inner width between the third intermediate wall and the fourth intermediate wall is constant or decreased toward the downstream end of the intermediate portion relative to the flow direction.

11. The combustor according to claim 8, wherein
the auxiliary supply unit includes a plurality of auxiliary supply units arranged space apart from each other, and the sealing unit includes a plurality of sealing units arranged spaced apart from each other.

12. A gas turbine comprising:
a compressor configured to take in air and to compress the air;
a combustor configured to mix fuel with compressed air supplied from the compressor and combust the mixture of the fuel and the compressed air in a combustion chamber to produce combustion gas; and
a turbine rotated by the combustion gas to generate electric power,
wherein the combustor comprises:
a nozzle casing;
a liner located downstream of the nozzle casing in a flow direction of the mixture of the fuel and the compressed air, and defining the combustion chamber,
a transition piece located downstream of the liner relative to the flow direction and configured to supply the combustion gas to the turbine; and
an injection nozzle located in the nozzle casing to inject the mixture of the fuel and the compressed air into the combustion chamber,
wherein the injection nozzle comprises:
an inlet portion receiving the fuel and a first portion of the compressed air;
an outlet portion located downstream of the inlet portion in the flow direction and configured to discharge the mixture of the fuel and the compressed air to the combustion chamber; and
an intermediate portion obliquely installed between the inlet portion and the outlet portion and connected to each of the inlet portion at the upstream end of the intermediate portion relative to the flow direction and the outlet portion at a downstream end of the intermediate portion relative to the flow direction, wherein a centerline of the intermediate portion extends from the upstream end of the intermediate portion to the downstream end of the intermediate portion,
an auxiliary supply unit installed in the inlet portion to supply an auxiliary air to the intermediate portion, the auxiliary air being a second portion of the compressed air; and
a sealing unit obliquely installed in the intermediate portion and connected to the auxiliary supply unit to seal the auxiliary supply unit at a downstream end of the auxiliary supply unit relative to the flow direction,
wherein a plurality of intermediate walls form the intermediate portion and the plurality of intermediate walls comprise a first intermediate wall and a second intermediate wall located opposite to the first intermediate wall, and
a plurality of outlet walls form the outlet portion and the plurality of outlet walls comprise a first outlet wall extending from the first intermediate wall and a second outlet wall extending from the second intermediate wall, and
an angle X is defined as an angle between a first extension line extending from the first outlet wall and the first intermediate wall and an angle Y is defined as an angle between a second extension line extending from the second outlet wall and the second intermediate wall, and the angle X is larger than angle Y.

* * * * *